July 19, 1938. L. GOLDHAMMER 2,124,292
PHOTOGRAPHIC CAMERA WITH PHOTOELECTRIC EXPOSURE METER
Filed March 21, 1936
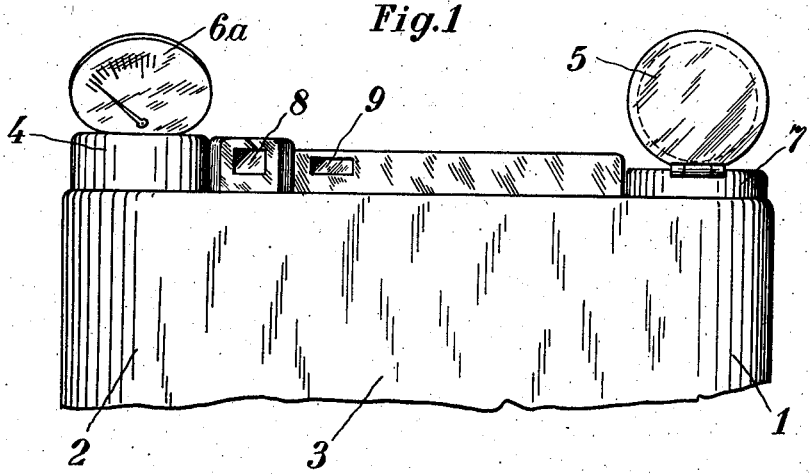
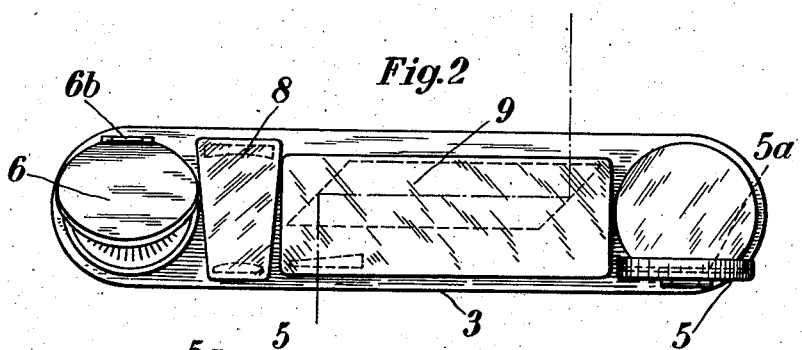
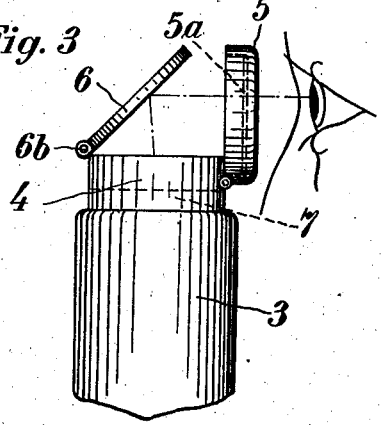
Leo Goldhammer
Inventor
By Philip S. Hopkins
Attorney Patented July 19, 1938

2,124,292

UNITED STATES PATENT OFFICE 2,124,292

PHOTOGRAPHIC CAMERA WITH PHOTO-ELECTRIC EXPOSURE METER

Leo Goldhammer, Munich, Germany, assignor to Agfa Ansco Corporation, Binghamton, N. Y., a corporation of New York Application March 21, 1936, Serial No. 70,000
In Germany March 23, 1935

2 Claims. (Cl. 88—23)

My present invention relates to a photographic camera provided with a photo-electric exposure meter.

One of its objects is an improved photographic roll film camera provided with a photo-electric exposure meter which is of simple construction. Another object is a photographic roll film camera provided with a photo-electric exposure meter which is efficient and convenient. Further objects will be seen from the detailed specification following hereafter.

It is known to provide photographic roll film cameras with photo-electric exposure meters. It has been proposed for instance to arrange the blocking-layer photo-electric cell behind the mirror of the view finder.

The present invention is concerned with a particularly useful and novel construction of a roll film camera provided with a photo-electric exposure meter. According to the improvement the cylindrical spool-chambers are extended in direction of their longitudinal axis, and the meter 6 and the blocking-layer cell are arranged in the spaces beside the spool-chambers. This construction is especially useful with cameras in which the film is fed into the take-up room by means of a claw mechanism so that a spool key may be dispensed with. In this case the lateral rooms for the film winding mechanism are empty and can be used for housing the exposure meter. The chief advantage of this arrangement is that, when holding the camera transversely, the exposure meter, the finder and the distance meter can be read off successively without removing the camera from the eye. The meter and the blocking-layer cell can be protected by dust shields. The cover of the meter is provided with a mirror on the inner side thus enabling to read off in direction of the optical axis.

In the accompanying drawing one embodiment is illustrated by way of example:

Fig. 1 shows the top part of a roll film camera held transversely and provided with a photo-electric exposure meter, view finder and distance meter, Fig. 2 shows a plan view and Fig. 3 a side view of the same subject.

Above the spool-chambers 1 and 2 of the roll film camera 3 there are arranged the meter, for instance, a moving coil galvanometer 4 and the blocking-layer cell 5a (a blocking-layer cell is a photo-electric cell of the cuprous oxide cell type). The moving coil instrument 4 can be covered by a lid 6 which is provided with a mirror on the inner side 6a. The hinge 6b has a friction of such an amount that the cover rests in every desired intermediate position. The blocking-layer cell 5a is arranged on the inner side of the pot-shaped cover 5 which is opened for measuring. When not in use, the cover 6 of the meter as well as the cover of the cell 5 are clapped against the camera housing, so that the cover 5 rests on the socket 7.

On the narrow top side of the camera there are also arranged the finder 8 and the distance meter 9 beside the photo-electric exposure meter. Finder and distance meter may be united so that the distance meter alone fills the space between the meter and the cell. The values indicated by the exposure meter may be read off in direction of the optical axis as well as in plan view. In the latter case the cover 6 of the meter is completely opened so that it stands perpendicularly to the measuring plane. While measuring the reflex finder is used for ascertaining the correct picture frame. When using the direct view finder and the distance meter the mirror 6a is opened only to an angle of 45°. The viewing apertures of the finder 8 and the distance meter 9 lie directly beside the mirror 6a of the meter 4 so that both instruments may be read off immediately one after another.

What I claim is:

1. A camera casing having an extension on one edge thereof, a closure cap pivoted to said extension, the inside surface of said cap being adapted to carry a light-sensitive cell, a second extension on said edge adapted to carry a meter for said cell, a closure cap pivoted to said second extension and having a mirror on its inner surface for reflecting the face of a meter in said extension.

2. A camera casing having an extension on one edge thereof, a closure cap pivoted to said extension, the inside surface of said cap being adapted to carry a light-sensitive cell, a second extension on said edge adapted to carry a meter for said cell, a closure cap pivoted to said second extension and having a mirror on its inner surface for reflecting the face of a meter in said extension, said closure caps being pivoted to said extensions on opposite sides from each other and in such manner that the first named cap faces in the direction of the object to which the camera casing is pointed for photographing and the second closure cap faces in the opposite direction when the same are opened.

LEO GOLDHAMMER.